Figure 1:
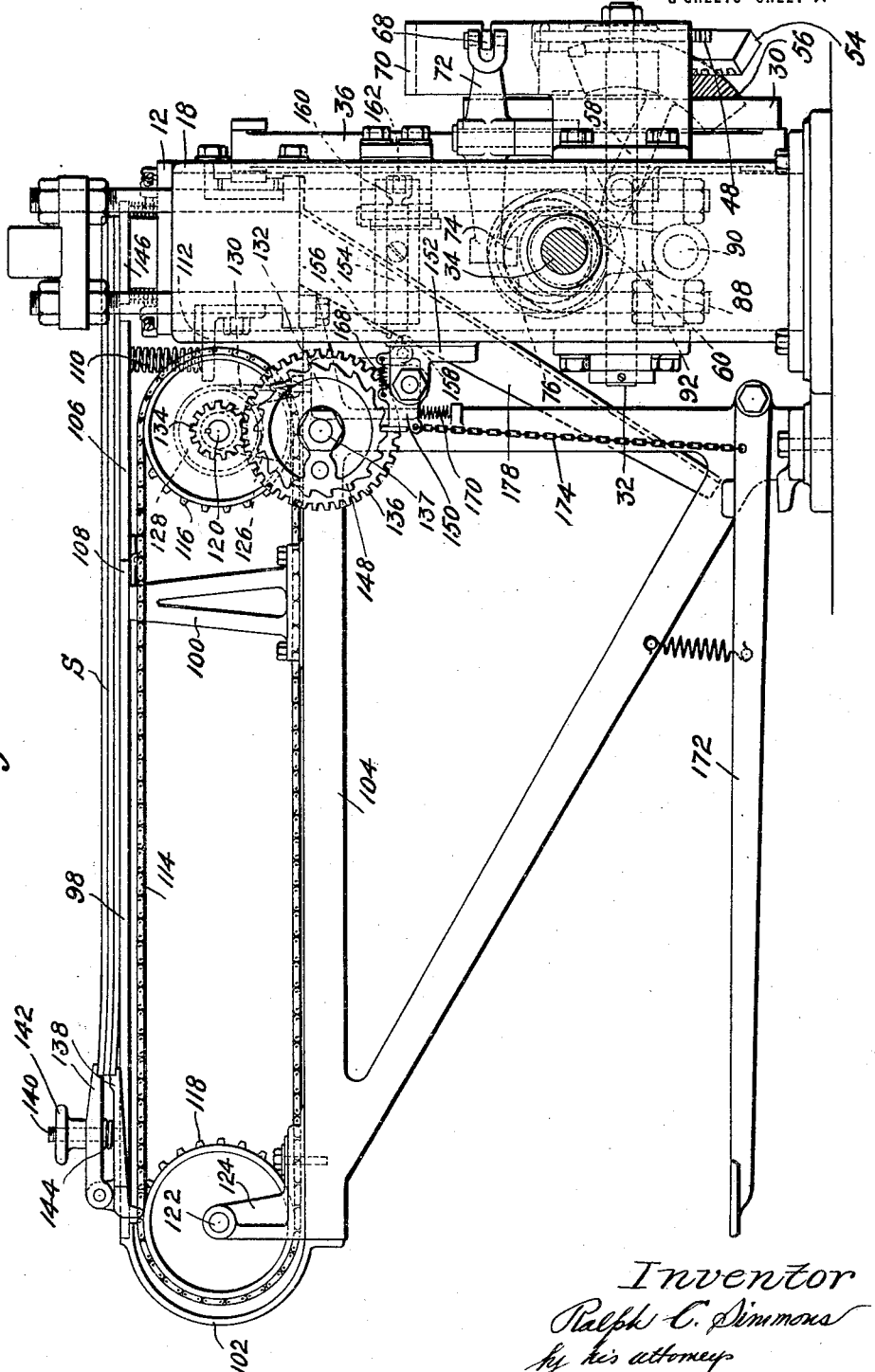

R. C. SIMMONS.
BLANK CUTTING MACHINE.
APPLICATION FILED FEB. 7, 1916.

1,275,617.

Patented Aug. 13, 1918.
3 SHEETS—SHEET 1.

Inventor
Ralph C. Simmons
by his attorneys
Phillips, Van Everen & Fish

R. C. SIMMONS.
BLANK CUTTING MACHINE.
APPLICATION FILED FEB. 7, 1916.
1,275,617.
Patented Aug. 13, 1918.
3 SHEETS—SHEET 2.
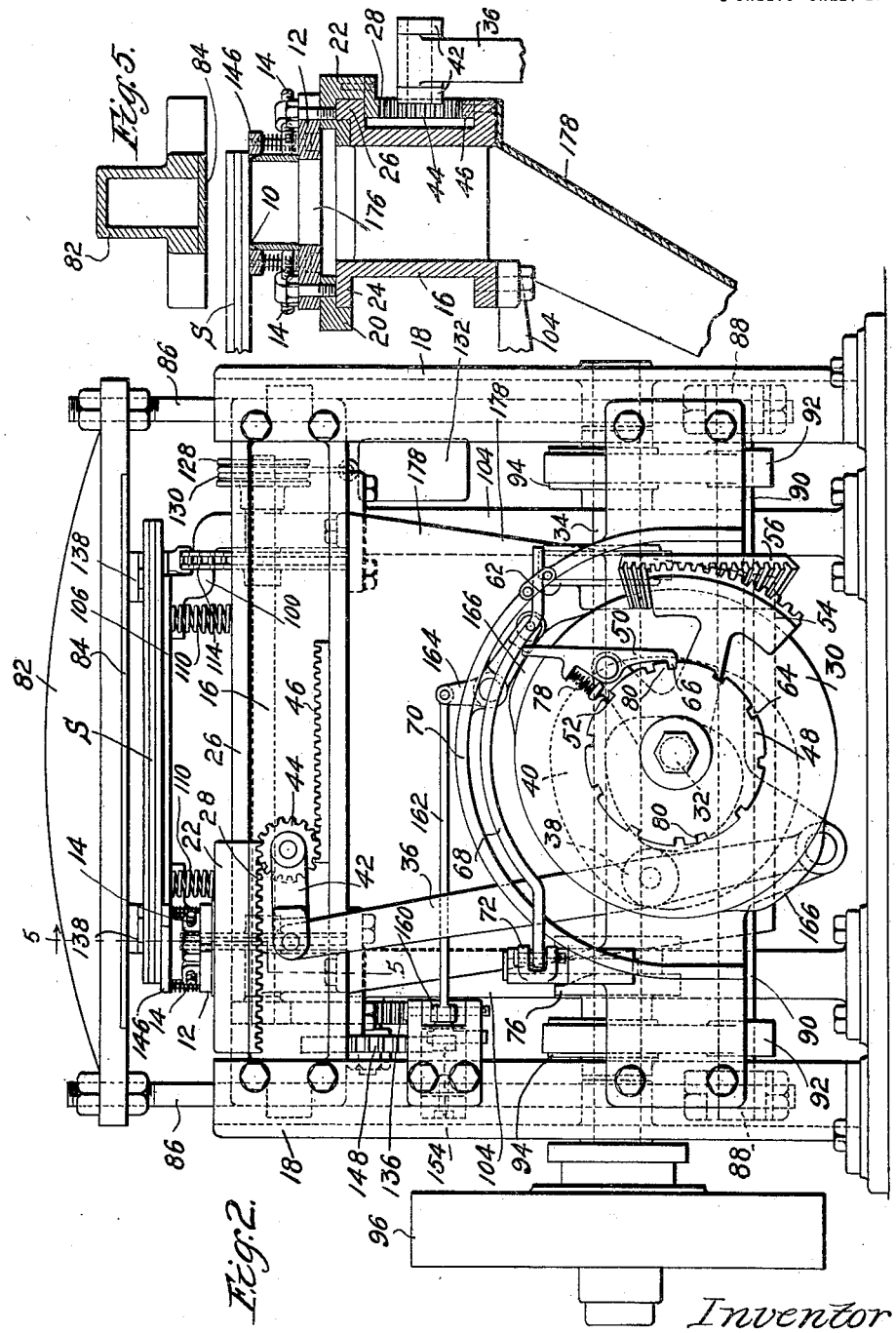
Inventor
Ralph C. Simmons
by his attorneys
Phillips, Van Everen Fish

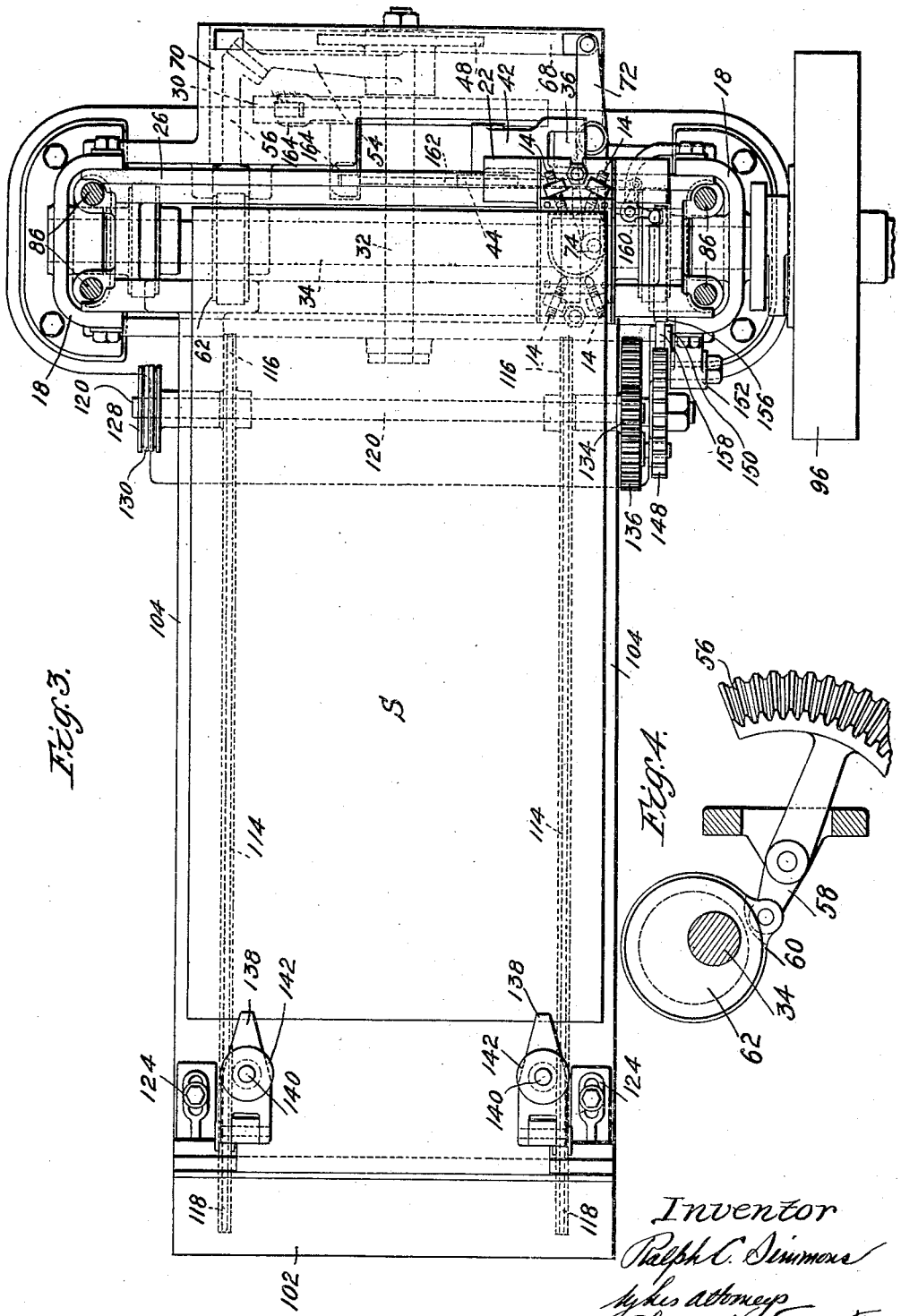

UNITED STATES PATENT OFFICE.

RALPH C. SIMMONS, OF BEVERLY, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

BLANK-CUTTING MACHINE.

1,275,617.	Specification of Letters Patent.	Patented Aug. 13, 1918.

Application filed February 7, 1916. Serial No. 76,640.

*To all whom it may concern:*

Be it known that I, RALPH C. SIMMONS, a citizen of the United States, residing at Beverly, in the county of Essex and State of Massachusetts, have invented certain new and useful Improvements in Blank-Cutting Machines; and I do hereby declare the following to be a full, clear, and exact description of the invention, such as will enable others skilled in the art to which it appertains to make and use the same.

This invention relates to blank cutting machines and more particularly to a machine in which large sheets of shoe stock material are automatically cut into blanks.

Certain types of blanks for shoes, such as heel lifts, counters, box toes, etc., are made in quantities of a single size by cutting up large sheets of stock, the cuts made by the die being placed as closely together as possible in order to secure as many blanks as possible from the sheet. The sheets used are generally of leather-board, fiber-board or a similar material which are made of a uniform size so that a number of sheets may be piled and cut at one time. Machines, such as beam dinkers, have been built which automatically impart a step-by-step movement to the cutting die across the beam to place it in position to make successive rows of cuts transversely of the sheet material. Such machines also advance the material longitudinally after each transverse row of cuts is made, preparatory to making the next row of cuts. In all of these machines, however, the mechanism for effecting the relative movement of the die and material, in making the blank cuts, is complicated and hard to control in order to cut the material with minimum waste.

The primary object of the present invention is to improve the construction and operation of automatic, blank cutting machines by which the relative movement of the cutting die and the stock to properly position the die for cutting the largest possible number of blanks from the stock, is made simple, efficient and accurately controlled.

Further objects of the invention include the simplification of the construction of machines of the type in question to eliminate moving the parts and an improvement in the mechanism for advancing the stock to be cut, as will be apparent to those skilled in the art from the following description.

With these objects in view, the invention comprises the novel improvements in blank cutting machines hereinafter described and set forth in the appended claims.

The several features of the invention are illustrated in the accompanying drawings, showing the preferred form of the invention, in which, Figure 1 is a view, in side elevation, of a blank cutting machine embodying the invention; Fig. 2 is a view, in front elevation, of the machine shown in Fig. 1; Fig. 3 is a plan view of the machine, the cutting block being removed; Fig. 4 is a detail view illustrating the connection of the driving mechanism of the die shifting cam with the main driving shaft; and Fig. 5 is a detail view, in vertical section, of the cutting die and cutting block taken on the line 5—5 of Fig. 2.

When operating the machine illustrated in the drawings for cutting blanks from sheet stock, the sheet stock is supported above the cutting die and the cutting block is reciprocated vertically to die out the blank. The cutting die is mounted upon a stationary bed, and after each cutting stroke of the cutting block it is shifted transversely of the stock, a distance equal to approximately the width of the blank, before the next cutting stroke of the cutting block. The cutting die is shifted step by step entirely across the stock, and after the completion of a transverse row of cuts the stock is automatically advanced longitudinally the length of a blank before the next cut. The cutting die is then shifted back step by step across its bed to make a row of cuts parallel to the preceding row. This operation automatically continues, the cutting die going back and forth across the stock making transverse rows of cuts, and the stock advancing after the completion of each transverse row of cuts until it is entirely cut into blanks.

In the embodiment of the invention illustrated in the drawings, the cutting die 10 is adjustably mounted on a carrier 12 by means of a series of set screws 14. The carrier 12 is slidably mounted upon a bedplate 16 which is supported between a pair of vertical columns 18 of the machine frame. The carrier is guided in its movement upon the bedplate 16 by means of guides 20 and 22 which fit over oppositely disposed flanges 24 and 26 of the bedplate 16. A rack plate 28 is secured to the bottom of the guide 22 and projects back under the flange 26 of the bedplate, so that it locks the carrier in position upon the bedplate.

The step-by-step movement of the die across the supporting bedplate is controlled by a die positioning cam which has a continuous connection with the cutting die. The die shifting or positioning cam 30 is secured to a cross-shaft 32 which is journaled in the machine frame immediately below the main driving shaft 34. A lever 36 is pivoted to the machine frame at the side of the cam and has a cam roll 38 on its side which projects into a cam slot 40. On the upper end of the lever is pivoted a carrier 42 in which is mounted a pinion 44 that meshes with the rack 28 on the die carrier and a rack 46 fastened on the bedplate 16. With this construction the movement of the cam lever directly effects the movement of the cutting die.

The cam is intermittently rotated to give the step-by-step movement to the cutting die in setting it for cutting successive blanks. This movement of the cam is secured by means of a ratchet wheel and pawl which are continuously actuated through a connection with the main driving shaft. The ratchet wheel 48 is fixed on the cross-shaft 32, and the pawl 50 is mounted above the ratchet wheel on one arm of a bellcrank lever 52 which is loosely mounted on the shaft 32 between the ratchet wheel 48 and the die shifting cam 30. The other end of the lever 52 is provided with a gear segment 54 which meshes with a gear segment 56 formed on an eccentric lever 58 pivoted to the machine frame. The end of the lever 58 opposite the gear segment 56 is connected with an eccentric strap 60 which is secured on an eccentric 62 mounted on the main driving shaft 34, see Fig. 4.

The same die positioning cam can be used in cutting all of the various sizes of blanks by varying the fraction of a revolution through which it is rotated for each movement of the die to thereby modify the movement of the die. To control the cam movement, the ratchet wheel 48 has a series of teeth 64 cut on its periphery, and the spacing of the teeth determines the fraction of a revolution through which the cam is intermittently moved. The teeth 64 are square cut, and when the face 66 of the pawl 50 engages the teeth, the ratchet wheel and pawl are locked together for movement in either direction. Since the pawl actuating mechanism is continuously operated, it is necessary to positively remove the pawl face 66 from the teeth 64 during the return or back stroke of the pawl. To this end, a pawl controlling lever 68 is slidably mounted in a guard 70 which is attached to the machine frame and projects over the cam and ratchet wheel. The lever 68 is connected to one end of a rocking lever 72 pivoted on the machine frame adjacent the main driving shaft 34, the other end of the rocking lever carrying a roll 74, see Figs. 1 and 3, which projects into a groove of a cam 76 mounted upon the main driving shaft. By these connections the pawl controlling lever 68 is reciprocated in a horizontal plane, see Fig. 2, and engages the end of the pawl 50, so that, as the lever is moved to the left, it will positively remove the pawl face 66 from the teeth of the ratchet wheel. The cam 76 is so timed that the pawl will be removed from the teeth of the ratchet wheel at the time the die is locked by the operation of cutting blanks, which is the time when the pawl 50 is making its back or return stroke.

With the cam rotating mechanism described above, the shifting movement of the cutting die can be accurately controlled to prevent an over-feed or under-feed of the cutting die. The pawl is positively locked in the teeth of the ratchet wheel during its forward or feeding stroke so that the cam cannot have an over-feed in positioning the shifting die for the succeeding cut. The oscillatory movement of the pawl actuating mechanism is so arranged that the pawl will be oscillated through a greater distance than is required to shift the cutting die through the distance required in cutting the largest blank to be made. In this way, the pawl always over-travels the teeth 64 upon its back or return stroke and is held out of the path of the teeth by the controlling lever 68. The pawl controlling lever, however, does not release the pawl until after the beginning of the forward or feeding stroke, and at this time a spring 78 forces the pawl face 66 against the periphery of the ratchet wheel so that it will engage the first tooth and carry the cam through the remainder of the feeding stroke of the pawl. Since the cam groove 40 of the die shifting cam is a closed path and the cam is rotated continuously in the same direction, in one revolution of the cam the cutting die will be moved from one side of the bedplate 16 transversely across the machine and back to the starting point, the movement of the cutting die being step-by-step, as described.

It will be noted in Fig. 2 that the formation of the teeth on the ratchet wheel 48 at the diametrically opposed points 80 are not spaced the same as the other teeth. This formation is to provide for a proper movement of the die shifting cam at the end of a complete row of cuts transversely of a sheet, at which time the cutting die remains fixed so as to be in position to make the first cut of the succeeding row of cuts at the edge of the sheet. At the time the pawl is in position to act on the teeth at the points 80, the corresponding portion of the cam groove 40 is concentrically formed so that the cutting die will not be shifted on the bedplate 16 when the stock is shifted longitudinally to position it for another row of transverse cuts.

After the cutting die has been positioned under the stock, the stock is cut by a vertically reciprocating cutting block 82 above the die. The cutting block, see Figs. 2 and 5, is a reinforced beam having a die engaging face 84 at its lower side. The beam is supported at each end upon a pair of vertical rods 86 which are slidably mounted in the columns 18 of the machine frame. The lower ends of each pair of the rods 86 are connected together by blocks 88, Fig. 1, and the blocks are connected together by a shaft 90. An eccentric rod 92, Figs. 1 and 2, is connected between the shaft 90 and an eccentric 94 on the main driving shaft, adjacent each of the blocks 88. The driving shaft 34 is continuously operating during the blank cutting operation and is arranged to be manually connected and disconnected from the driving power through the ordinary type of clutch on the driving pulley 96. The cutting block, therefore, will be continuously reciprocated during the operation of the machine by its connection with the main driving shaft.

During the cutting operation the sheet stock "S" rests upon a table 98 which is supported at one end upon a pair of arms 100 and at the other end upon a guard 102, the arms and guard being mounted upon a pair of triangular brackets 104, Figs. 1 and 2, which project from the rear of the machine frame. The table has a movable section 106 which is hinged to a fixed section 108. The forward end of the movable section is held up by a pair of springs 110 which are mounted on brackets 112 projecting from the bedplate 16. This movable section 106 allows the sheets of stock to move down with the cutting block when blanks are being cut. The face of the table is normally substantially flush with the top of the cutting die so that, when the stock is pushed along the table, it will move over the top of the die.

The stock is automatically advanced across the table to the die by means of a conveyer which has a pair of clamps for holding the stock in a predetermined position with relation to the die. A conveyer chain 114 is mounted at each side of the table 98 between sprockets 116 and 118 which are keyed on shafts 120 and 122 respectively. The shaft 122 is mounted in journals 124 which are adjustable on the brackets 104 so that the chain may be tightened or loosened as desired. The shaft 120 is mounted in journals 126 secured to the brackets 104, and each end of the shaft projects beyond the sprocket wheel 116. On the end of the shaft projecting from the right of the sprocket wheel, Figs. 2 and 3, is mounted a drum 128, on which is wound a cord 130 having a weight 132 attached thereto. The weight serves as the power for moving the conveyer and advancing the stock across the die. On the end of the shaft 120 projecting from the left of the sprocket wheel is keyed a pinion 134 which meshes with a controlling gear 136 rotatably mounted on a stud 137 secured in a bracket 104. A stock clamp is attached to each of the conveyer chains 114 which has a pair of jaws 138 between which the end of the stock is clamped. The lower jaw 138 is rotatably mounted on the chain 114 and the upper jaw is pivoted to the lower jaw. To clamp the stock, a screw 140 is secured in the lower jaw which extends through an opening in the upper jaw, and a hand-wheel 142 is mounted upon the screw above the upper jaw. The jaws are normally held in open position by means of a spring 144 so that the stock may be readily placed between them. The table supports the stock while it is being fed, and the clamps serve to force the stock along the table and hold it in proper alined position to be advanced to the cutting die. When the stock has been advanced up to the die, the ends of the lower jaws 138 of the clamps will engage a stripper plate 146 around the cutting die and stop the movement of the conveyer.

The movement of the conveyer in advancing the stock is controlled by an escapement which is operated by the blank cutting mechanism. The escapement, see Fig. 1, consists of a ratchet wheel 148 and a compound pawl 150. The ratchet wheel is adjustably mounted upon the controlling gear 136, and the pawl 150 is mounted upon a bracket 152 secured to a column 18 of the machine frame. Since the conveyer is advanced only after a transverse row of cuts has been cut on the stock, the escapement is operated after the last cut of a transverse row has been made. To operate the escapement, a plunger 154 is mounted upon the vertically reciprocating rods 86 which support the die block. This plunger has a tooth 156 which is arranged to be moved into and out of the path of a tail pawl 158 pivotally mounted upon the escapement pawl 150. The plunger 154 is moved into the path of the tail pawl 158 by means of a bellcrank lever 160, Figs. 1 and 3, one arm of which has a sliding contact with the plunger 154, and the other arm of which is connected by a rod 162 with a bellcrank 164 which is arranged to engage cam faces 166 formed on the surface of the cam 30. The cams 166 are diametrically arranged on the periphery of the cam 30 in a position to operate the plunger when the cutting die has been shifted to its extreme positions at the sides of the machine. The tail pawl 158 will move in a clockwise direction against a spring 168 so that, if the plunger tooth 156 is forced into the path of the tail pawl while it is above the pawl, the tooth will rotate the tail pawl as it moves down but will not affect the ratchet pawl 150. The tail pawl, however, is locked with the escapement pawl 150 for counterclockwise movement so that, if the tooth 156 is brought into the path of the tail pawl while it is below the pawl, the upward movement of the tooth will actuate the ratchet pawl 150 to release the ratchet wheel 148. Upon releasing the ratchet wheel the weight 132 will immediately advance the conveyer. When the tooth 156 disengages the tail pawl after the ratchet wheel has been released from the pawl 150, the pawl 150 will be immediately forced back against the ratchet wheel by a spring 170 so that the ratchet wheel will advance only through the distance of one tooth. An advance of one tooth of the ratchet wheel will permit the conveyer to advance the length of a blank. By the time the plunger 154 has moved down past the tail pawl 158 in the succeeding stroke, the surface cams 166 will have advanced so that the tooth 156 will be withdrawn from the path of the pawl and it will not be placed into position to actuate the pawl again until another half revolution of the cam 30, at which time another transverse row of cuts has been made.

The operation of the machine is as follows: A series of superposed sheets of stock, such as leather-board, are placed upon the table 98 with their forward edges projecting across the cutting die. The clamps are fastened over the rear ends of the sheets and the ratchet wheel 148 of the escapement mechanism is adjusted so that a tooth will rest against the pawl 150. The machine is then started and the cutting block descends to cut the first blank. While the block is being raised the cutting die is shifted a distance equal to the width of the die, to be in position for the next cutting stroke of the cutting block. This operation continues until a row of cuts is made completely across the stock. After the last cut in the row has been made, the escapement mechanism of the conveyer is operated through the cam 166 and the stock is advanced longitudinally the length of a blank. The cutting die then returns step by step across the stock, cutting a row of blanks parallel to the first row. This operation continues until the sheet has been entirely cut into blanks. The operator then releases the clutch to stop the machine, and also releases the escapement ratchet wheel from the pawl 150. This latter operation is performed by pressing upon a treadle 172 which is connected by a chain 174 with the pawl 150. The conveyer is then manually drawn back to a position to clamp a new pile of sheets of leather-board, and while it is being drawn back, the conveyer actuating weight 132 is wound up on the drum 128.

As the blanks are cut they are forced down through the hollow die 10 and an opening 176 in the carrier 12. It will be seen in Fig. 5 that the bedplate 16 is hollow so that the blanks may fall through the bedplate. A chute 178 is attached to the bottom of the bedplate 16 to direct the died-out blanks toward the rear of the machine.

It will be necessary to change the die for each different size of blank, and the controlling ratchet wheel 48 of the die shifting cam will also be changed for each different width of blank. The sheet stock will ordinarily be chosen so that the blanks will be cut without waste, and the die can be given any desired length of feeding step across the bedplate 16 by changing the racks 28 and 46 and the pinion 44. Also, with each change in length of a blank, it will be necessary to change the ratchet wheel 148 of the conveyer escapement mechanism. For all of these changes, however, the same controlling cam 30 may be used.

The nature and scope of the invention having been indicated and its preferred embodiment having been specifically described what is claimed as new, is:—

1. A blank cutting machine having, in combination, a cutting die, a stationary bed for the die, means for automatically shifting the die to different positions on the bed, a movable cutting block, and means for actuating the block.

2. A blank cutting machine having, in combination, a cutting die, a stationary bed for the die, means for automatically shifting the die step by step across the bed to set the die for making a row of cuts transversely of a sheet of stock, a movable cutting block, and means for actuating the block.

3. A blank cutting machine having, in combination, a cutting die, a stationary bed for the die, means for automatically shifting the die step by step across the bed in opposite directions to set the die for making a series of rows of cuts transversely of a sheet of stock, a movable cutting block, and means for actuating the block.

4. A blank cutting machine having, in combination, a cutting die, a stationary bed for the die, means for automatically shifting the die step by step across the bed to set the die for making a row of cuts transversely of a sheet of stock, means for automatically advancing the sheet longitudinally after the completion of a transverse row of cuts, a movable cutting block, and means for actuating the block.

5. A blank cutting machine having, in combination, a cutting block, a die for cutting against the block, a die positioning cam, a connection between the die and the cam, means to continuously rotate the cam step by step in the same direction to actuate said connection and intermittently advance the die, and means to relatively move the die and cutting block to cut blanks.

6. A blank cutting machine having, in combination, a cutting block, a cutting die, a die positioning cam, a connection between the die and cam, means to intermittently actuate the cam to shift the die back and forth step by step transversely of the machine, means to vary the movement of the cam for cutting different sizes of blanks, and means to relatively actuate the die and cutting block to cut blanks.

7. A blank cutting machine having, in combination, a movable cutting block, a cutting die, a stationary bed for supporting the die, a die positioning cam, a connection between the cam and die, means to actuate the cam to shift the die, and means to operate the block.

8. A blank cutting machine having, in combination, a cutting block, a cutting die, a die positioning cam having a closed operating path, a connection between the cam and die, means to intermittently actuate the cam in the same direction to shift the die step by step transversely of the machine in opposite directions, and means to relatively move the die and block to cut blanks.

9. A blank cutting machine having, in combination, a cutting block, a cutting die, a die positioning cam, a continuous connection between the die and cam, means to intermittently actuate the cam to shift the die step by step transversely of the machine, means to control the movement of the cam to prevent an under-feed or an over-feed of the die, and means to relatively move the die and cutting block to cut blanks.

10. A blank cutting machine having, in combination, a cutting block, a cutting die, a die positioning cam, a continuous connection between the die and cam, means to intermittently actuate the cam to shift the die step by step transversely of the machine mechanism to lock the cam to the actuating mechanism during the feeding stroke to prevent an over-throw of the die, and means to relatively move the die and cutting block to cut blanks.

11. A blank cutting machine having, in combination, a cutting block, a cutting die, a die positioning cam, connections between the die and the cam, a continuously operating mechanism for actuating the cam to shift the die, means for intermittently locking the mechanism to and unlocking it from said cam, and means to relatively move the die and block to cut blanks.

12. A blank cutting machine having, in combination, a cutting block, a cutting die, means for positioning blank stock on the die, a die positioning cam, a connection between the cam and the die, means to intermittently actuate the cam to shift the die back and forth transversely across a sheet to make rows of cuts, means to relatively actuate the die and block to cut blanks, and means to automatically advance the sheet longitudinally after the die has completed each transverse row of cuts.

13. A blank cutting machine having, in combination, a cutting block, a cutting die, a bed for supporting the die, a rack on said bed, a rack attached to the die, a die shifting cam, a lever connected for movement by said cam, a pinion on said lever in engagement with the racks on the bed and die, means for moving the cam to shift the die across the bed, and means for relatively moving the die and cutting block to cut blanks.

14. A blank cutting machine having, in combination, a cutting block, a stationary bed for a cutting die, a cutting die movably mounted on said bed, a die positioning cam, a connection between the cam and the die, a continuously operating ratchet for intermittently moving the cam, and means for actuating the cutting block.

15. A blank cutting machine having, in combination, a cutting block, a cutting die, a die positioning cam, connections between the cam and the die, a ratchet wheel mounted on the cam, a continuously operating pawl for actuating the ratchet wheel, means for intermittently locking and unlocking the pawl from the ratchet wheel, and means for relatively moving the die and block to cut blanks.

16. A blank cutting machine having, in combination, a cutting block, a cutting die, a support for blank stock, a conveyer for advancing stock to the die, means for moving the conveyer, an escapement mechanism for controlling the movement of the conveyer, a cam to actuate the escapement to advance the stock after a predetermined number of cuts of the die, and connections between the escapement and the cam.

17. A blank cutting machine having, in combination, a cutting block, a cutting die, a support for sheet stock, a conveyer for advancing stock across the support, weight and cord for moving the conveyer, means to relatively move the block and die to cut blanks, and means controlled by the relative movement of the block and die to control the movement of the conveyer to advance the stock.

18. A blank cutting machine having, in combination, a cutting block, a cutting die, a support for sheet stock, a conveyer for advancing stock across the support, means for moving the conveyer, escapement mechanism for controlling the advance of the conveyer, a cam for controlling the escapement mechanism, means to operate the cutting block to cut blanks, and means carried by the cutting block operating means to actuate the escapement mechanism.

19. A blank cutting machine having, in combination, a cutting block, a cutting die, means for moving the die back and forth transversely to the machine to make transverse rows of cuts, a conveyer for advancing sheet stock to the die, means for moving the conveyer, a ratchet and pawl escapement for controlling the movement of the conveyer, means to actuate the block to make a cut, devices on the block actuating means for engaging the pawl to operate the escapement, and means to place said devices in position to actuate the pawl after the die has completed the transverse row of cuts.

RALPH C. SIMMONS.

Copies of this patent may be obtained for five cents each, by addressing the "Commissioner of Patents, Washington, D. C."